(12) United States Patent  (10) Patent No.: US 8,607,741 B2
Perry et al.  (45) Date of Patent: Dec. 17, 2013

(54) ANIMAL RESTRAINING DEVICE

(76) Inventors: Frank C. Perry, Lake Forest, CA (US); David J. Paddock, Aliso Viejo, CA (US)

( * ) Notice: Subject to any disclaimer, the term of this patent is extended or adjusted under 35 U.S.C. 154(b) by 0 days.

(21) Appl. No.: 13/610,634

(22) Filed: Sep. 11, 2012

(65) Prior Publication Data

US 2013/0061819 A1  Mar. 14, 2013

Related U.S. Application Data

(60) Provisional application No. 61/533,729, filed on Sep. 12, 2011.

(51) Int. Cl.
*A01K 1/06* (2006.01)

(52) U.S. Cl.
USPC .......................................... 119/786; 119/756

(58) Field of Classification Search
USPC ................... 119/786, 769, 771, 756
See application file for complete search history.

(56) References Cited

U.S. PATENT DOCUMENTS

| 3,433,521 | A | * | 3/1969 | Lasko | 294/92 |
| 3,658,037 | A | * | 4/1972 | Hunter | 119/786 |
| 4,186,688 | A | * | 2/1980 | Gaitan | 119/712 |
| 4,620,506 | A | * | 11/1986 | Stubbs | 119/780 |
| 4,712,510 | A | * | 12/1987 | Tae-Ho | 119/708 |
| 4,738,222 | A | * | 4/1988 | Terry et al. | 119/781 |
| 4,828,210 | A | * | 5/1989 | Anderson et al. | 248/229.15 |
| 4,899,694 | A | * | 2/1990 | Belluomini | 119/771 |
| 5,791,805 | A | * | 8/1998 | Lynch et al. | 403/374.1 |
| 5,967,093 | A | * | 10/1999 | Vitt et al. | 119/705 |
| 6,079,368 | A | * | 6/2000 | Paddock | 119/756 |
| 6,247,428 | B1 | * | 6/2001 | Mireles | 119/795 |
| 7,115,051 | B2 | * | 10/2006 | Hansberry | 473/423 |
| 7,770,540 | B2 | * | 8/2010 | Halpern | 119/706 |
| 2006/0158549 | A1 | * | 7/2006 | Digweed et al. | 348/373 |

* cited by examiner

*Primary Examiner* — Yvonne Abbott
(74) *Attorney, Agent, or Firm* — Vista IP Law Group LLP

(57) ABSTRACT

An animal restraining device can have an adjustable length to facilitate wedging the device securely between two walls or other structures to restrain an animal. The animal restraining device can include a first mechanism to adjust the length of the device and a second mechanism to further adjust the length of the device. In some embodiments, the first mechanism can perform large adjustments and the second mechanism can perform small adjustments.

16 Claims, 6 Drawing Sheets

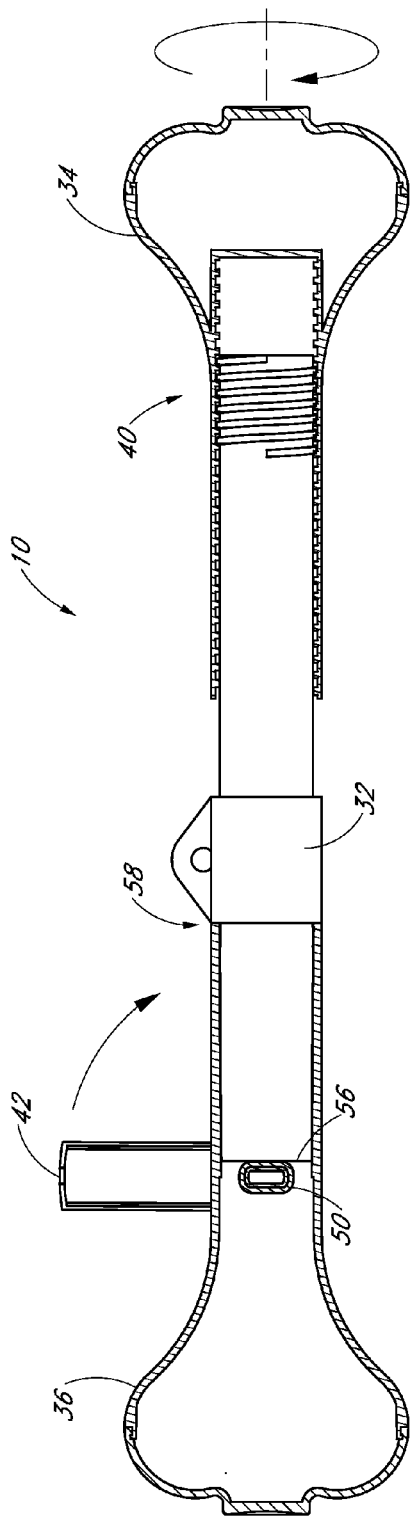
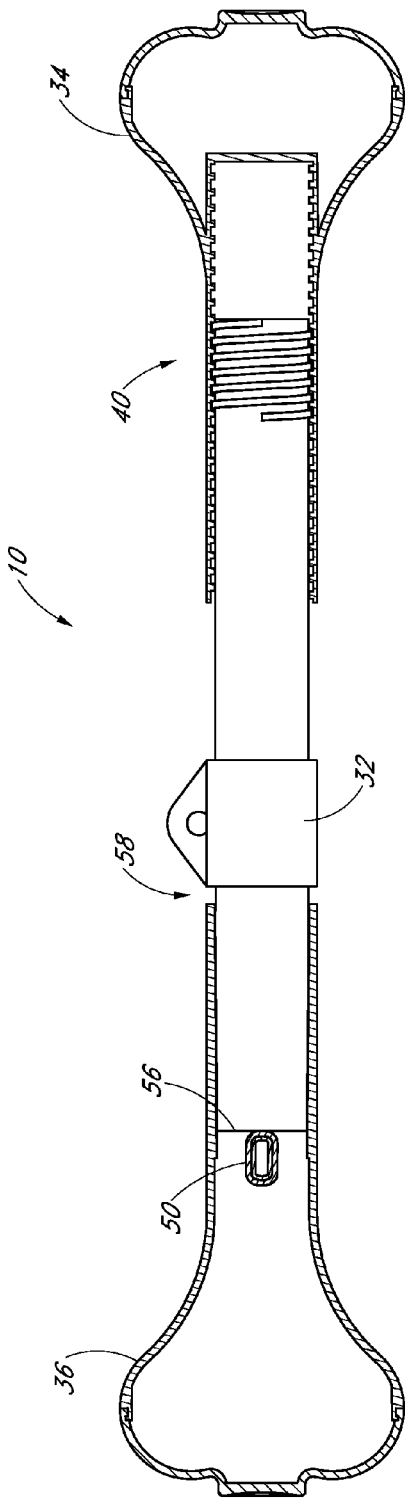
FIG. 7A
FIG. 7B

ANIMAL RESTRAINING DEVICE

This Application claims the benefit of U.S. provisional Application No. 61/533,729, filed on Sep. 12, 2012, in accordance with 35 U.S.C. Section 119(e), and any other applicable laws. U.S. Provisional Application No. 61/533,729 is hereby incorporated by reference in its entirety as if set forth fully herein.

BACKGROUND OF THE DISCLOSURE

1. Field of the Disclosure

Certain embodiments disclosed herein relate generally to an animal restraining device. In particular, an animal restraining device can be secured between two surfaces, such as the sides of a bathtub or the walls of a shower stall, and to which an animal such as a dog can be attached so as to restrain the animal during washing of the animal. The animal restraining device can also be used in other situations and locations such as for general grooming, fur trimming or shearing, nail trimming, veterinary visits, transportation, etc.

2. Description of the Related Art

There are many different types of animal restraining devices. U.S. Pat. No. 6,079,368 to Paddock entitled "Animal Grooming Restraint" and incorporated by reference herein, illustrates certain prior art animal restraining devices. As shown in FIG. 1, the animal grooming restraint has two rods 2, 4 that are connected through a threaded connection 6. A user can change the length of the grooming restraint be simply rotating one rod with respect to the other. The grooming restraint is placed between two opposing surfaces, such as within a bathtub, and then one rod is rotated until a tight fit is obtained between the grooming restraint and the bathtub. The animal can then be attached to the grooming restraint by connecting the latch 8 with a collar, harness, or other securement device on the animal.

FIGS. 2 and 3 illustrate another prior art grooming restraint. A lever 12 is pivotally connected to two rods 14, 16 and a cylindrical housing 18. Moving the lever 12 from the position shown in FIG. 2 to the position shown in FIG. 3 causes the two rods to 14, 16 to extend out farther from the initial position and engage the walls of a bathtub or shower. The animal can then be attached to the grooming restraint.

SUMMARY OF THE DISCLOSURE

There exists a need for improvement in animal restraining devices. An improved animal restraining device can have an adjustable length to facilitate wedging the device securely between two walls or other structures to restrain an animal. The animal restraining device can include a first mechanism to adjust the length of the device and a second mechanism to straightforwardly and more securely adjust the length of the device. In some embodiments, the first mechanism can perform large adjustments and the second mechanism can perform small adjustments.

In some embodiments, an animal restraining device can comprise a first rod, a second rod, a third rod, a first mechanism, and a second mechanism. The first mechanism can comprise a threaded connection between the first and second rods, the threaded connection configured to provide linear movement in response to the rotation of either of the first rod and the second rod to thereby change the length of the animal restraining device. The second mechanism can be used to further adjust the length of the animal restraining device. The first mechanism can perform comparatively large adjustments and the second mechanism can perform comparatively small adjustments. The second mechanism can include a cam. The length of the animal restraining device can be adjusted by manipulation of the relationship of the third rod and the second rod by adjusting the position of the cam.

According to some embodiments, the animal restraining device can further comprise a lever attached to the cam configured to rotatingly change the position of the cam. The cam can have a first position where the lever is inline with the length of the animal restraining device and a second position where the lever is substantially perpendicular to the length.

Some embodiments of animal restraining device comprise a first rod, a second rod, a third rod, and a cam. The second rod can be connected to the first rod by a threaded connection. The length of the animal restraining device can adjust by manipulation of the relationship of the first rod and the second rod through the threaded connection so that rotational movement is converted to linear movement to change the length of the animal restraining device. The length of the animal restraining device can further be adjusted by manipulation of the relationship of the third rod and the second rod by adjusting the position of the cam. A lever to change the position of the cam may also be included.

Other embodiments of animal restraining devices can include an outer housing, a first adjustment mechanism, and a second adjustment mechanism. The first adjustment mechanism can provide a first adjustable length for adjusting the length of the outer housing. The second adjustment mechanism can provide a second adjustable length less than the first adjustable length for further adjusting the length of the outer housing. The second adjustment mechanism can include a cam positioned within the outer housing such that rotation of the cam adjusts the length of the outer housing.

A method of restraining an animal using a device friction fit between opposing structures can include one or more of the following steps. Adjusting a first mechanism to lengthen a rod to approximately a distance between first and second opposing structures. Adjusting a second mechanism to lengthen the rod, the rod now forming a friction fit between the first and second opposing structures. Securing an animal to the rod.

A method according to some embodiments can comprise providing a restraint operable to change its length, said change occurring by adjusting a first mechanism to lengthen said restraint to approximately a distance between first and second opposing structures and adjusting a second mechanism to lengthen the restrain, the restraint now forming a friction fit between the first and second opposing structures; and providing a securing mechanism attachable to an animal.

BRIEF DESCRIPTION OF THE DRAWINGS

Various embodiments are depicted in the accompanying drawings for illustrative purposes, and should in no way be interpreted as limiting the scope of the inventions, in which like reference characters denote corresponding features consistently throughout similar embodiments.

FIGS. 7A and B schematically illustrate a plurality of mechanisms for length adjustment of the animal restraining device of FIG. 4.

DETAILED DESCRIPTION

One difficulty with friction fit restraining devices is providing straightforward adjusting mechanisms that create sufficient tension against a frame between which the devices are designed to hang. For example, in the present disclosure, an animal restraining device includes adjustment mechanisms for varying the length of the device in order to suspend the device between opposing structures. In an embodiment, a first macro length adjustment allows a user to quickly and closely match the distance between the opposing structures. A second micro length adjustment allows the user to straightforwardly and simply lock the animal restraining device in a tight friction fit between the opposing structures, such as, for example the walls of a bathtub.

Figure 2:
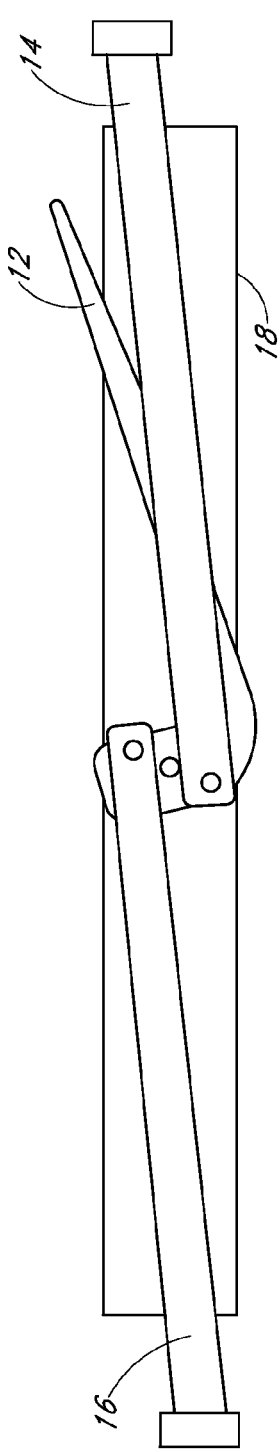
FIGS. 2 and 3 show another prior art animal grooming restraint shown in two different positions.
Figure 3:
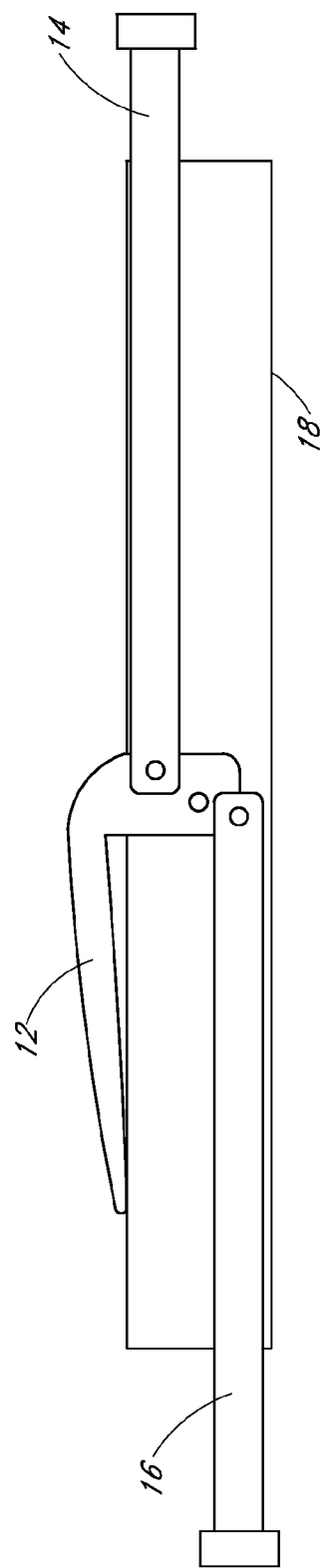

In an embodiment, the macro length adjustment advantageously includes a threaded telescoping relationship between portions of the restraining device. By spinning or twisting one portion with respect to the other, the total length of the restraining device relatively quickly increase or decreases. Such quick macro adjustment provides convenience to the user to quickly and approximately fit the device to varying spaces. Such a macro adjustment, however, becomes problematic as the length of the device approaches the length between sides of the opposing structures, for example, the walls of a bathtub, sides of a sink, or other opposing surfaces. For example, the macro adjustment may not provide a reliably secure friction fit. A small turn may result in a relatively large length adjustment making it difficult to achieve the desired length and friction fit. Moreover, a macro twisting motion may be relatively complicated near the appropriate secured length. Additionally, for lever actuated macro adjustments, like those of FIGS. 2 and 3, the rods 14 and 16 at full locking pivot may not match the distance needed between opposing surfaces, thereby preventing a stable locking of the device.

In an embodiment, the micro length adjustment advantageously provides a small lengthwise displacement configured for a locking friction fit of the restraining device in place. The micro length adjustment may also straightforwardly unlock the friction fit of s secured device. For example, in an embodiment, the micro length adjustment comprises a lever handle advantageously allowing a user to apply or remove torque, when needed to form or remove a uniform a friction fit lock.

Although disclosed with reference to a first and second adjustment, the macro adjustment could advantageously include other mechanisms causing a comparatively large displacement for providing an approximate initial desired length of the restraining device. For example, the macro adjustment may include one or more levers, telescoping slides with, for example a twist lock or the like, ratchet mechanisms, electric motorized mechanisms, power drill or screwdriver interfaces, like a rotating screw head, or other mechanisms recognizable to an artisan from the disclosure herein. Similarly, the micro adjustment could advantageously include similar or other mechanisms causing a comparatively small displacement forming the fiction fit at each end thereof.

To facilitate a complete understanding of the invention, the remainder of the detailed description describes the invention with reference to the drawings, wherein like reference numbers are referenced with like numerals throughout.

Figure 4:
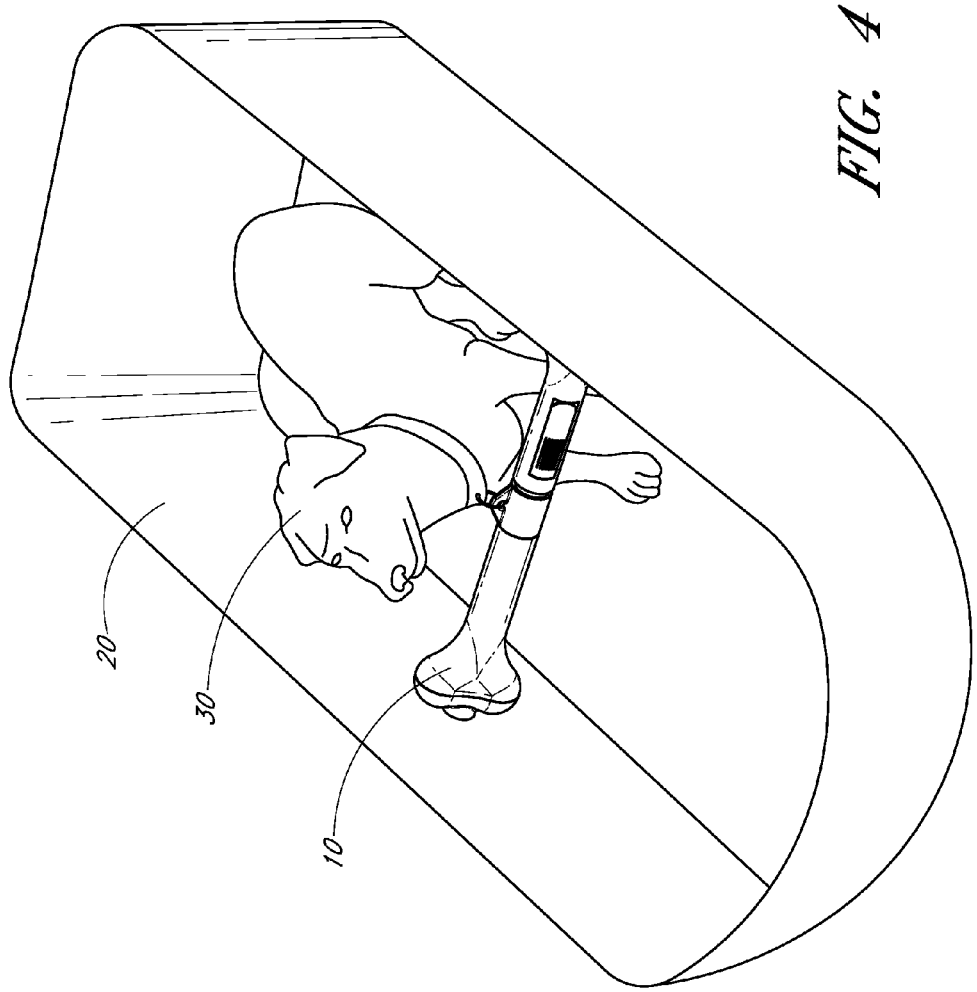
FIG. 4 shows a dog attached to an animal restraining device according to an embodiment of the present disclosure.

FIG. 4 illustrates an embodiment of an animal restraining device 10 secured to opposing sidewalls 20, such as those found in, for example, a bathtub. FIG. 4 also shows the device 10 restraining a dog 30. In such a position a user can wash or otherwise groom the dog 30. It should be understood that though the animal restraining device 10 is shown in use with a dog in a bathtub, the animal restraining device 10 can be used with many different animals, for many different purposes and with many different structures. For example, the animal restraining device can be used for general grooming, fur trimming or shearing, nail trimming, veterinary visits, transportation, etc.

An animal restraining device 10 as shown can comprise a generally rod-shaped securing device, the length of which is adjustable to facilitate wedging horizontally, or otherwise, tightly and securely between two walls, such as two vertical walls. The device functions as a sturdy temporary beam which can be easily installed and removed by changing the length of the device. The term "rod-shaped" is used loosely and is intended to include any elongate shape which can span from one wall to another wall, or between two structures which are generally parallel with each other. These walls can be the walls of a bathtub, a shower stall, or other structures. The walls can also be one wall of one structure and one wall of another structure. In addition, though the term wall is used, it will be understood that the animal restraining device can be used between many different objects.

Adjustment of the length of the animal restraining device 10 can be accomplished in many different ways, as will be described in detail below. This adjustment can be used to create a friction fit between the device 10 and two other generally parallel structures, such as two walls, on either side of the device 10. In such a position, the outward ends 22, 24 (FIG. 5) of the device 10 can engage the two other generally parallel structures. Each outward end 22, 24 of the device 10 can be provided with a skid resistant material for frictional engagement with a wall. The skid resistant material may be rubber, natural or synthetic sponge-like material, plastic, or some other suitable material. Material selection can be based on many different criteria, including being selected so as not to damage walls, for example of a bathtub. The size or amount of skid resistant material may be selected depending upon various factors including coefficient of friction, and the force which the securing device is designed to exert on the ends. Moreover, the ends 22, 24 may advantageously pivot, be semi-pivotable, or include a compressible material in order to firmly friction fit to less than true parallel walls.

Figure 1:
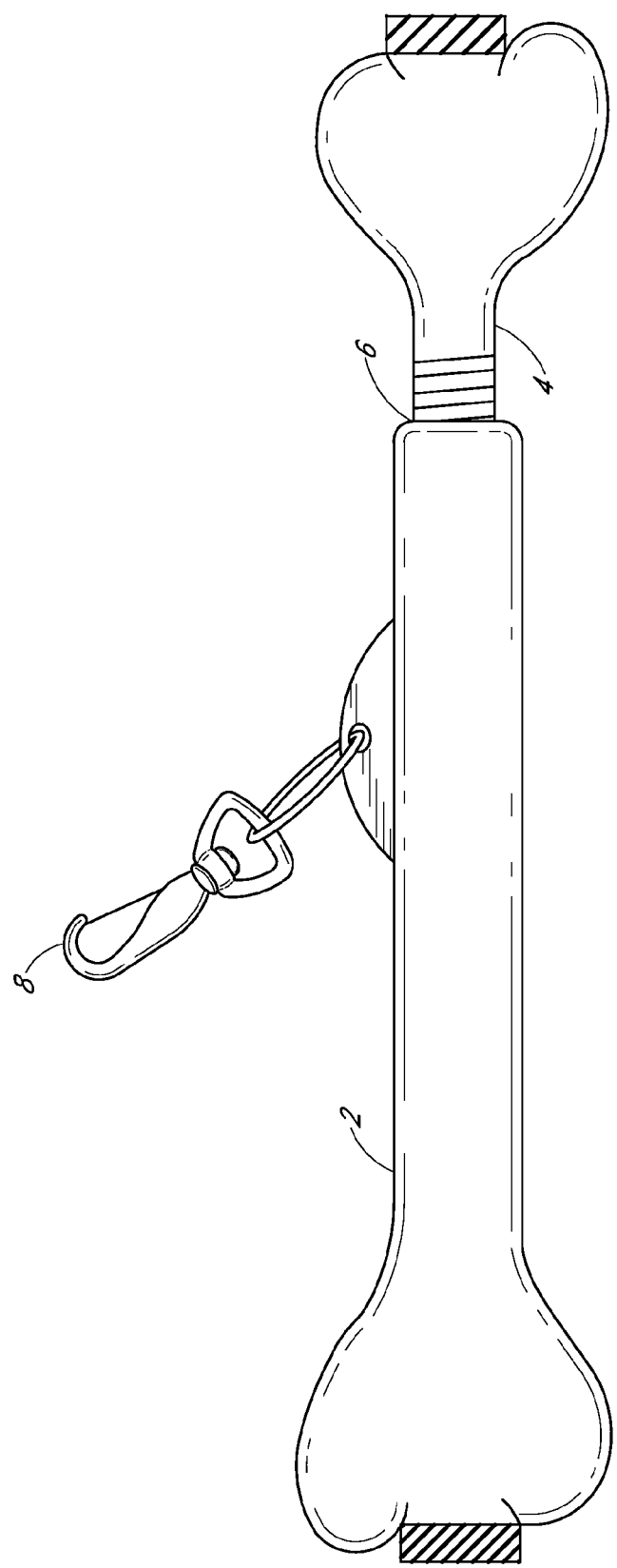
FIG. 1 shows a prior art animal grooming restraint.

Once the animal restraining device 10 is positioned in the desired location, a dog 30 or other animal can be attached to the animal restraining device 10 as shown in FIG. 4. An attachment mechanism such as a clip or carabineer (for example, FIG. 1, item 8) can be used for easy attachment of the animal to the animal restraining device 10. For example, the animal can be attached to the animal restraining device 10 in a bathtub 20 with a latching device attached to the dog's collar. The latching device can include one of more of a clip, carabineer, ring, cotter pin, "D"-clip, and an open-eye screw.

Figure 5:
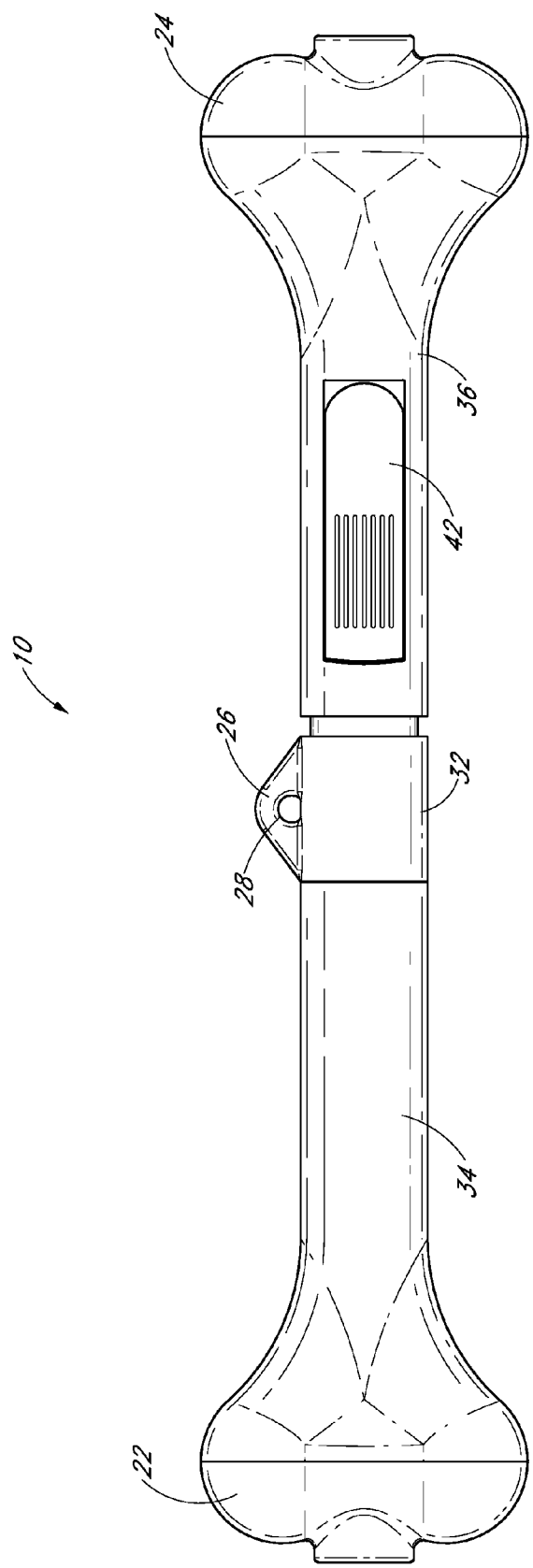
FIG. 5 shows a side view of an embodiment of the animal restraining device of FIG. 4.

The latching device can connect to the animal restraining device 10 at an attachment point 26 (FIG. 5). The attachment point 26 is shown as a generally centrally located protrusion that extends from the animal restraining device 10, although other locations may be preferable for certain expected installations. The attachment point 26 includes a hole 28 through which the latching device can be physically advanced and secured to the attachment point 26.

The attachment point 26 can be constructed in many different ways. As additional examples, the attachment point 26 can be a U-shaped extension, a ring that surrounds a part of the outer housing of the device, a hole drilled through the outer housing, etc. Another variation of the attachment point 26 involves placing a latching device into a mold for a component of the animal restraining device. The latching device can then be directly secured to the animal restraining device during the molding process i.e., before the polymerizable resin has hardened.

Figure 6:
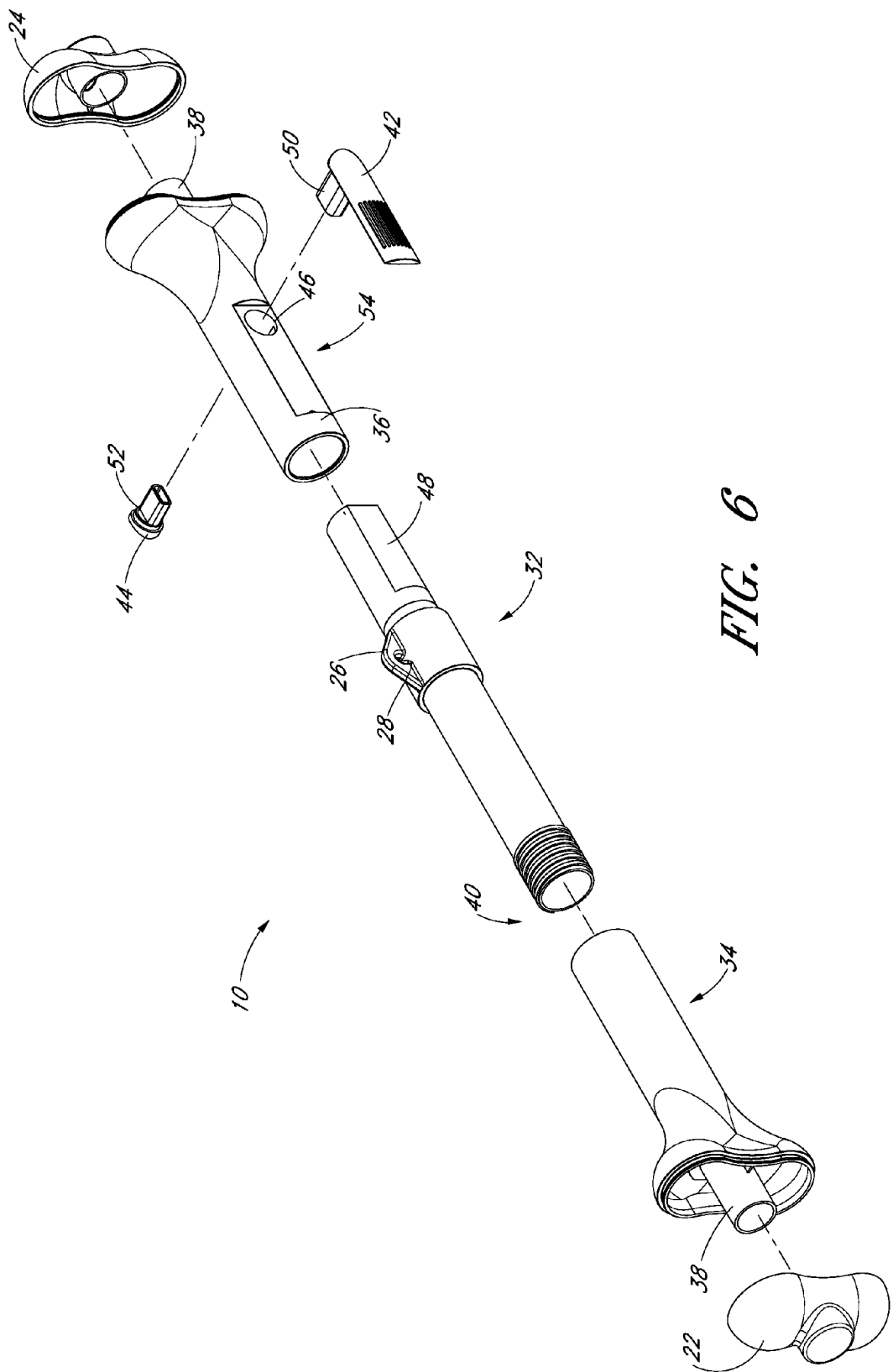
FIG. 6 shows an exploded perspective view of the animal restraining device of FIG. 4.

Referring now to FIGS. 5 and 6, the components of the illustrated animal restraining device 10 will be described, after which an explanation as to the functioning of the device will be provided.

The animal restraining device 10 can have a main body or rod 32 as well as two side rods or bodies 34, 36. The side rods 34, 36 can be positioned on either side of the central body 32. Each side rod 34, 36 can include an end 22, 24 for engaging with a wall or other structure. The ends 22, 24 can be formed integrally with their respective side rods 34, 36 or can be separate pieces. As illustrated, the ends 22, 24 are separate pieces that are made of a material different from that of the side rods 34, 36. This can allow the ends 22, 24 to be made of a material best suited for engaging side walls of a structure such as a bathtub.

It can also be seen that each of the side rods 34, 36 has a protrusion 38 which extends into the end portion 22, 24. This protrusion 38 can be useful to ensure the proper tensioning of the animal restraining device 10. The protrusion 38 can also decrease in size from the main bodies of the side rods 34, 36. This can allow the protrusion 38 to provide a more specific point of contact with the wall or other structure.

As illustrated, the main body 32 and one of the side rods 34 is connected through a threaded connection 40. The main body 32 is shown with external screw threads which can engage internal screw threads within an axial bore of the side rod 34. It will be understood that the configuration of the internal and external screw threads can be reversed. The side rod 34 can be screwed onto the external screw threads of the main body 32 with engagement of the screw threads and rotation about its axis. The further rotation of the two parts can result in either a lengthening or a shortening of the overall length of the device, depending upon the direction of rotation.

The other side rod 36 can be slid over the main body 32 connecting via a friction fit. It will be understood that the side rod 36 and the main body 32 can be connected in other ways. For example, the side rod 36 can be secured onto the main body 32 in any suitable manner to allow some movement of the side rod 36 with respect to the main body 32. Examples include key slots, a slot and a peg, a J-slot, or other types of configurations.

The side rod 36 is also shown with a cam 50. As will be described in more detail below, the cam 50 can be positioned within a hole 46 and can be used to adjust the relative positions of the side rod 36 and the main body 32. As shown, the cam is attached to a lever 42. Movement of the lever can move the cam to one of various positions. A plug 44 can also attach to the other side of the cam from the lever 42. This can secure the cam within the hole 46 in the side rod 36.

In some embodiments, a part of the cam, lever, or plug can include a circular surface 52 to engage the hole 46 and to ensure proper rotation of the cam 50. For example, the cam 50 can connect to the lever 42 at a circular surface and the plug 44 can also have a circular surface 52. In this way, both ends of the combined lever, cam, and plug can engage the hole 46 with the circular surfaces to ensure the proper rotation of the cam 50. The radius of the circular surface can be larger, smaller, or the same as that largest radius of the cam 50.

As also illustrated, the side rod 36 has a flat portion 54 on the outer surface. This flat portion 54 can allow the lever 42 to move without obstruction through the desired range of motion. It can also be seen that the main body 32 has one or more flat portions 48. The flat portion 48 can be configured to engage with a flat portion inside the side rod 36 such as the flat portion opposite the flat outer surface 50. Cooperating flat surfaces 50 and 48 ensure that the side rod 46 will not rotate with respect to the main body 32.

The operation of the animal restraining device 10 will now be explained in greater detail. In some embodiments, the animal restraining device 10 can have a first adjustment mechanism and a second adjustment mechanism. Each adjustment mechanism can function to adjust the overall length of the animal restraining device. Each adjustment mechanism can adjust the overall length in different ways and/or to different extents. For example, one adjustment mechanism can provide large or macro displacements while the other provides smaller or micro displacements. One can have an adjustable length that is less than the adjustable length for the other. For example, one adjustable length can be from 0 to about: 3, 4, 5, 5.5, 6, or 8 inches or more, while the other adjustable length can be from 0 to about $\frac{1}{8}$, $\frac{3}{16}$, $\frac{1}{4}$, $\frac{1}{3}$, or $\frac{1}{2}$ inch or less. In some embodiments, the adjustment length of the smaller adjustment mechanism can be less than about: 3%, 4%, or 5% of the adjustment length of the larger adjustment mechanism.

Moving now to FIGS. 7A and 7B, the functioning and lengthening of the illustrated animal restraining device 10 will now be described. It will be understood that all, or part, of the animal restraining device 10 can function in additional ways then those described herein. For example, the animal restraining device 10 can have one adjustment mechanism as described herein and one adjustment mechanism of another type.

As has been mentioned, the main body 32 and the side rod 34 are connected through a threaded connection 40. It will be understood that rotating either of the main body or the side rod 34 with respect to the other will cause the animal restraining device to increase or decrease in length. The threaded connection 40 can provide a large displacement and increase in length in the animal restraining device 10. Other methods for providing large displacement can be used. Examples of other methods include ratchet devices, a peg and a longitudinal slot with multiple side slots, etc.

The length of the animal restraining device 10 can be first adjusted to a general length by rotating one of the main body 32 and the side rod 34 about its axis relative to the other piece so that the device fits between the vertical walls where it is to be installed, e.g., the walls of a bathtub. The animal restraining device 10 can then be placed in the desired location between the vertical walls where it is to be installed. The animal restraining device 10 is then held in place with one hand while the other hand rotates one of the main body 32 and the side rod 34 relative to the other to cause the device to expand and increase in length. As the ends are forced against the walls of the bathtub under pressure, the rod-shaped device can become securely yet releasably mounted within the bathtub. In some embodiments as will be described below, a secondary adjustment can also be made to further secure the device in place.

Lengths, thicknesses and threading can be selected based on many factors such as: the dimensions of the space to be spanned, the strength of the animal, and the characteristics of the material of which the restraining device is constructed. For example, when fully extended, the device can be from 20 to 30 inches in length. When fully collapsed or retracted, the device can be from 15 to 25 inches in length. The threading can be about 6 to 16 threads per inch, about 8 to 12 threads per inch, or about 10 threads per inch.

The number of threads per inch can be selected so that the friction at the threaded connection 40 is sufficient to prevent rotation and loosening of the device during use. If the number of threads per inch is too small, the device will easily rotate by itself during the washing of the animal and come loose. However, if the threading is selected to be too fine, i.e., too many threads per inch, many revolutions will be needed to secure the device, and further, it may be possible to over-torque the device and either damage the device or the bathtub in which the device is being secured.

The animal restraining device 10 can also include a second adjustment mechanism. According to some embodiments, the second adjustment mechanism may provide a small displacement or change in length in the animal restraining device 10. As illustrated, the animal restraining device 10 includes a cam 50. The cam 50 can be moved between multiple positions to change the overall length of the animal restraining device 10. The lever 42 can be used to adjust the position of the cam 50.

Comparing FIG. 7A to FIG. 7B, it can be seen that the cam 50 has two positions. In the first position, with the lever 42 perpendicular to the longitudinal axis of the animal restraining device 10, the cam 50 is positioned in such a way to provide a shorter length to the animal restraining device 10. In FIG. 7B, the cam 50 has been rotated by moving the lever 42 down towards the longitudinal axis of the animal restraining device 10. The cam 50 is thereby moved to position which increases the length of the animal restraining device 10. For simplicity, a two position cam is shown, but it should be understood that the cam can have multiple surfaces or a gradually changing surface to provide for multiple different adjustments to the length of the animal restraining device 10.

Further comparing FIG. 7A to FIG. 7B, it can be seen that the size of a gap 58 is increased in FIG. 7B from FIG. 7A. The gap 58 illustrates the small change in length caused by the cam 50. In this way, the screw mechanism or threaded connection 40 can provide a large displacement in the length of the animal restraining device 10 and then the cam 50 can provide a smaller change in length. As explained above, the threaded connection 40 can be used to generally establish the desired length of the animal restraining device 10. Once this length has been set with the animal restraining device 10 tightly positioned between two opposing surfaces, a second adjustment mechanism, here cam 50, can be used to provide a final amount of tightening to further secure the animal restraining device 10 in place.

The animal restraining device 10 can be simple, lightweight, compact, made of non-corrosive materials, and can be quickly and easily installed between opposing vertical walls such as the walls of a bathtub or shower. The device can enable pet owners and others to securely restrain their animals, such as, while the animals are being bathed indoors. Because of the secure control of the animal restraining device 10, the animal can be aware that their range of movement is restricted and thus the animal usually will remain stationary and calm. With the animal restraining device 10, an animal can be easily restrained between opposing walls, even those which provide no apparent attachment fixtures for attachment of animals, such as the walls of a bathtub or shower stall.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. An animal restraining device for restricting the movement of an animal between two structures, the animal restraining device comprising:
    a first rod;
    a second rod;
    a third rod;
    a first mechanism to adjust the length of the animal restraining device comprising:
        a threaded connection between the first and second rods, the threaded connection configured to provide linear movement in response to the rotation of either of the first rod and the second rod to thereby change the length of the animal restraining device; and
    a second mechanism to further adjust the length of the animal restraining device, wherein the first mechanism is configured to perform comparatively large adjustments and the second mechanism is configured to perform comparatively small adjustments, the second mechanism comprising:
        a cam, the length of the animal restraining device further being adjustable by manipulation of the relationship of the third rod and the second rod by adjusting the position of the cam.

2. The animal restraining device of claim 1, further comprising a lever attached to the cam configured to rotatingly change the position of the cam.

3. The animal restraining device of claim 2, wherein the cam has a first position where the lever is inline with the length of the animal restraining device and a second position where the lever is substantially perpendicular to the length.

4. The animal restraining device of claim 1, wherein the cam is positioned within the third rod and an end of the second rod is positioned against and engages the cam.

5. The animal restraining device of claim 1, wherein the cam has a cam surface, a first end and a second end, both ends positioned perpendicular to the cam surface, the first and second ends having a circular portion to rotate the cam surface within the third rod.

6. An animal restraining device comprising:
    a first rod;
    a second rod connected to the first rod by a threaded connection, the length of the animal restraining device being adjustable by manipulation of the relationship of the first rod and the second rod through the threaded connection wherein rotational movement is converted to linear movement to change the length of the animal restraining device;

a third rod; and a cam, the length of the animal restraining device further being adjustable by manipulation of the relationship of the third rod and the second rod by adjusting the position of the cam.

7. The animal restraining device of claim 6, further comprising a lever attached to the cam configured to rotatingly change the position of the cam.

8. The animal restraining device of claim 7, wherein the cam has a first position where the lever is inline with the length of the animal restraining device and a second position where the lever is substantially perpendicular to the length.

9. The animal restraining device of claim 8, wherein the animal restraining device is longer when the cam is in the first position than when the cam is in the second position.

10. The animal restraining device of claim 6, wherein the cam is positioned within the third rod and an end of the second rod is positioned against the cam.

11. The animal restraining device of claim 6, wherein the cam has a cam surface, a first end and a second end, both ends positioned perpendicular to the cam surface, the first and second ends having a circular portion to rotate the cam surface within the third rod.

12. The animal restraining device of claim 6, wherein the animal restraining device is configured such that manipulation of the relationship of the first rod and the second rod through the threaded connection can provide a greater change in length than the manipulation of the relationship of the third rod and the second rod through the cam.

13. An animal restraining device comprising:

an outer housing;

a first adjustment mechanism providing a first adjustable length for adjusting the length of the outer housing;

a second adjustment mechanism providing a second adjustable length less than the first adjustable length for further adjusting the length of the outer housing, the second adjustment mechanism comprising a cam wherein the cam is positioned within the outer housing such that rotation of the cam adjusts the length of the outer housing.

14. The animal restraining device of claim 13, wherein the adjustment length of the first adjustment mechanism is between 0 to 5.5 inches and the adjustment length of the second adjustment mechanism is 0 or 3/16 inch.

15. The animal restraining device of claim 13, wherein the adjustment length of the second adjustment mechanism is less than 5% of the adjustment length of the first adjustment mechanism.

16. The animal restraining device of claim 13, wherein the first adjustment mechanism comprises an external screw thread and an internal screw thread used to convert rotational movement to linear movement.

\* \* \* \* \*